US012782496B2

(12) United States Patent
Veith et al.

(10) Patent No.: US 12,782,496 B2
(45) Date of Patent: Nov. 3, 2026

(54) METHOD AND APPARATUS FOR RAPID LOCATION OF DATA ACQUISITION DEVICES

(71) Applicant: Thinaer, Inc., Richardson, TX (US)

(72) Inventors: Taylor Veith, Port Saint Lucie, FL (US); Paul M. Kavanaugh, Addison, TX (US); Richard R. Hegedus, Dallas, TX (US)

(73) Assignee: Thinaer, Inc., Richardson, TX (US)

( * ) Notice: Subject to any disclaimer, the term of this patent is extended or adjusted under 35 U.S.C. 154(b) by 710 days.

(21) Appl. No.: 18/113,529

(22) Filed: Feb. 23, 2023

(65) Prior Publication Data

US 2023/0273289 A1 Aug. 31, 2023

Related U.S. Application Data

(60) Provisional application No. 63/314,432, filed on Feb. 27, 2022.

(51) Int. Cl.
*G01S 5/14* (2006.01)
*G01S 5/00* (2006.01)
*G01S 5/02* (2010.01)

(52) U.S. Cl.
CPC ............ *G01S 5/145* (2013.01); *G01S 5/0081* (2013.01); *G01S 5/021* (2013.01); *G01S 5/02213* (2020.05)

(58) Field of Classification Search
CPC . G01S 5/021; G01S 5/14; G01S 5/145; G01S 5/02213; H01S 5/0081; H04W 64/00
See application file for complete search history.

(56) References Cited

U.S. PATENT DOCUMENTS 10,009,868 B1 6/2018 Reyes et al.
11,083,419 B2 8/2021 Brasch et al.
(Continued)

OTHER PUBLICATIONS

T. M. Fernandez, J. Rodas, C. J. Escudero and D. I. Iglesia, "Bluetooth Sensor Network Positioning System with Dynamic Calibration," 2007 4th International Symposium on Wireless Communication Systems, Trondheim, Norway, 2007, pp. 45-49, doi: 10.1109/ISWCS.2007.4392299 (Year: 2007).*
(Continued)

*Primary Examiner* — Cassi J Galt
(74) *Attorney, Agent, or Firm* — Kaplan Breyer Schwarz, LLP

(57) ABSTRACT

A method and apparatus for locating a beacon in physical space, where the beacon communicates with at least one of a plurality of gateways in the physical space. First signals are transmitted between gateways located at respective physical locations. Gateway-to-gateway measurements of power related to the first signals are stored. The gateway-to-gateway measurements are averaged to obtain averaged gateway-to-gateway measurements. Second signals are transmitted between a beacon and one or more of the gateways. Beacon-to-gateway measurements of power related to the second signals are stored. The beacon-to-gateway measurements are averaged to obtain averaged beacon-to-gateway measurements. First distances between the beacon and the gateways are calculated based on the averaged gateway-to-gateway measurements and the averaged beacon-to-gateway measurements. Second distances are calculated based on at least ones of the averaged beacon to gateway measurements and an expected measurement of power related to the beacon. Position of the beacon is determined based on the second distances. The position of the beacon is transmitted so that the position is subsequently displayed.

22 Claims, 8 Drawing Sheets

(56) References Cited

U.S. PATENT DOCUMENTS

| | | | | |
|---|---|---|---|---|
| 2010/0176950 | A1 | 7/2010 | Bartholf et al. | |
| 2014/0243016 | A1* | 8/2014 | Denis | H04W 64/003 455/456.1 |
| 2016/0084646 | A1* | 3/2016 | Chen | G01S 5/0226 702/150 |
| 2019/0326015 | A1 | 10/2019 | Cannell et al. | |
| 2021/0335488 | A1 | 10/2021 | Higginson | |
| 2021/0343127 | A1 | 11/2021 | Chan | |
| 2022/0373639 | A1 | 11/2022 | Shaw et al. | |
| 2022/0386414 | A1 | 12/2022 | Bush et al. | |
| 2023/0042066 | A1 | 2/2023 | Liff et al. | |

OTHER PUBLICATIONS

Examiner Interview Summary Record (PTOL-413) Mailed on Oct. 22, 2024 for U.S. Appl. No. 17/951,678, 1 page(s).

Notice of Allowance and Fees Due (PTOL-85) Mailed on Oct. 22, 2024 for U.S. Appl. No. 17/951,678, 8 page(s).

Michael J. Rivera et al., Unpublished Related U.S. Appl. No. 17/951,678 entitled Data Acquisition Management System and Method Thereof, Sep. 23, 2022, 55 pp.

Final Rejection Mailed on Apr. 19, 2024 for U.S. Appl. No. 17/951,678, 17 page(s).

Charu C. Aggarwal et al., Outlier Ensembles—An Introduction, published 2017, Springer International Publishing, DOI 10.1007/978-3-319-54765-7 , pp. 217-218, 221-223, https://books.google.com/books?hl=en&Ir=&id=UNmfDgAAQBAJ.

Non-Final Rejection Mailed on Jan. 4, 2024 for U.S. Appl. No. 17/951,678, 14 page(s).

Requirement for Restriction/Election Mailed on Oct. 18, 2023 for U.S. Appl. No. 17/951,678, 5 page(s).

* cited by examiner

| Timestamp | Sending Gateway | Recipient Gateway | RSSI |
|---|---|---|---|
| 2021-11-14 19:00:01 | D | B | -67 |
| 2021-11-14 19:00:58 | D | C | -76 |
| 2021-11-14 19:01:12 | D | E | -71 |

FIG. 3

| Timestamp | Sending Beacon at Gateway | Recipient Gateway | $RSSI_{New}$ |
|---|---|---|---|
| 2021-11-14 19:00:01 | D | B | -78 |
| 2021-11-14 19:00:58 | D | C | -87 |
| 2021-11-14 19:01:12 | D | E | -82 |
| 2021-11-14 19:01:15 | D | B | -82 |
| 2021-11-14 19:01:55 | D | B | -74 |

$RSSI_{\mu}$ for Beacon at Gateway D sending to Gateway B= -78

FIG. 5

| Sending Gateway | Receiving Gateway | $RSSI_{\mu}$ |
|---|---|---|
| . | . | . |
| . | . | . |
| . | . | . |
| C | A | -69 |
| C | B | -110 |
| C | C | -43 |
| C | D | -79 |
| C | E | -89 |
| D | A | -89 |
| D | B | -89 |
| . | . | . |
| . | . | . |
| . | . | . |

FIG. 6

| Beacon | Receiving Gateway | RSSI |
|---|---|---|
| A | A | -43 |
| A | B | -110 |
| A | C | -50 |
| A | D | -100 |
| A | E | -60 |

FIG. 7

METHOD AND APPARATUS FOR RAPID LOCATION OF DATA ACQUISITION DEVICES

RELATED APPLICATIONS

This application claims the benefit of U.S. Provisional Patent Application No. 63/314,432, filed Feb. 27, 2022, the entire disclosure of which is incorporated herein by reference.

FIELD

The present disclosure relates to location determination and more particularly to location determination of devices associated with other devices or sensors. Specifically, a method and apparatus are disclosed for rapidly identifying the location of beacons in a gateway occupied system.

BACKGROUND

In any observed system, a plurality of physical components perform various functions. One type of component affects physical characteristics of an environment, such as light, heat, cooling, humidity, etc. Another type of component is associated with a manufacturing process, and may include devices that provide mechanical force, transport raw ingredients, modify environmental factors as a product is being produced, etc. A third type of component may be related to a transportation system, and may include devices that propel or channel transport units between multiple locations. A fourth type of component may relate to a healthcare environment and may include devices that affect environmental attributes (temperature, humidity, etc.), devices that monitor patients (heart monitors, oxidation monitors, etc.), and devices associated with the performing of medical procedures (surgical tools, diagnostics tools, etc.). A fifth type of component may monitor process progress and provide data associated with how far a process has proceeded and/or whether or not process completion has occurred.

The physical devices situated in such systems are subject to operational changes. Some such changes may be deliberate, some such changes may occur in response to environmental factors, and some such changes may be undesirable. Examples of operational changes include: device defect, partial or complete device failure, repairing a defective part, adjusting control of a physical device, replacing, eliminating or adding a physical device, changing a process partially or completely, changing an environment.

When physical devices change in their operation, the output of the physical devices may change, and there may be a consequential result. For example, if a heating unit malfunctions, environmental temperature may subsequently change. In one scenario, a human being becomes aware of the temperature fluctuation because they "feel cold" and then the cause of the change will be investigated. In another situation, a sensor such as a temperature gauge may be consulted to determine the extent of temperature change. In either case, the simplicity of the problem may result in the identification of the problem at least at a very basic level ("the heater is not working") so that further diagnostics may occur.

In a commercial, industrial, or healthcare setting (for example), monitoring and subsequent interaction may be more sophisticated than a person simply becoming aware that something is "not right." In a hospital or a manufacturing facility, for example, various sensors may be active with sensor results provided to a monitoring station. When an audible or visible alarm is activated at the monitoring station (or a measurement is conveyed that may be indicative or a problematic situation), a designated person can note the alarm (and/or conveyed measurement) and provide instructions for taking or initiating corrective action. In a hospital's cardiac department, for example, a remote heart monitor can provide data that indicates a patient requires defibrillation. In a nuclear power plant, a remote temperature monitor can indicate that a nuclear reaction has become "runaway" and rods need to be inserted into the power plant's core.

U.S. patent application Ser. No. 17/951,678, which is assigned to Thinaer, Inc., the Assignee herein, describes a data acquisition management system and method. The aforementioned system and method relates to the use of beacons that provide data to gateways. The data that a beacon provides to one or more gateways may include the location of a respective beacon and/or sensor data (e.g., sensor data from a sensor associated with a beacon). The location may be in absolute terms on a map or in relative terms relative to another location. The sensor data may be environmental data (e.g. temperature, humidity, pressure) or it may be logical data (e.g. whether or not one or more portions of a process have been completed).

Methods for determining beacon location are known, however, those known methods may require time for the beacon location to be determined. For example, using some methods for determining beacon location, beacon location determination may take 30 or more seconds to complete. Thus, a beacon (attached to a critical object) may be moved, and information about where that beacon has been moved to may not be available to a remote observer for the processing time consumed to determine the new location. In the above example, 30 or more seconds pass before the remote observer is able to see the new location. For a high value asset, 30 or more seconds to identify where a beacon has been moved to may be unacceptable. If the asset has high financial value (expensive jewelry), then a 30 or more second delay (before location of a stolen asset may be available) may be unacceptable. If the asset has high lifesaving a value (lifesaving equipment in a hospital setting), then again a 30 or more second delay (before location of lifesaving equipment becomes available) may be unacceptable.

Therefore, it is desirable for the location of a beacon to be determined at a faster rate than what can be achieved using existing methods.

SUMMARY

Described herein is a method for locating a physical position of a beacon in physical space, wherein the beacon communicates with at least one of a plurality of gateways in the physical space. In various embodiment, the method comprises: transmitting first signals between gateways located at respective physical locations; storing gateway-to-gateway measurements of power related to the first signals; averaging the gateway-to-gateway measurements to obtain averaged gateway-to-gateway measurements; transmitting second signals between the beacon and one or more of the gateways; storing beacon-to-gateway measurements of power related to the second signals; averaging the beacon-to-gateway measurements to obtain averaged beacon-to-gateway measurements; calculating first distances between the beacon and the gateways based on the averaged gateway-to-gateway measurements and the averaged beacon-to-gateway measurements; calculating second distances based on at least ones of the averaged beacon to gateway measurements and an expected measurement of power related to the beacon; determining and storing the position of the beacon based on the second distances; and transmitting the position of the beacon so that the position is subsequently displayed.

In some embodiments of the method, the beacon is associated with a sensor for measuring an environmental related parameter.

In some embodiments of the method, the first distances are Euclidean distances.

In some embodiments of the method, the second distances are based on log distance propagation model.

In some embodiments of the method, the position is displayed with the environmentally related parameter acquired by the sensor.

In some embodiments of the method, the averaged gateway-to-gateway measurements are each a median.

In some embodiments of the method, the averaged beacon-to-gateway measurements are each a mean.

In some embodiments of the method, the gateway-to-gateway measurements of power that are stored are expected measurements of power at a distance from each of the gateways.

In some embodiments of the method, the Euclidean distances are used to determine which of the averaged beacon-to-gateway measurements are used for calculating the second distances.

In some embodiments of the method, at least one of: a) the gateway-to-gateway measurements; or b) the beacon-to-gateway measurements are normalized with each other prior to the averaging of the gateway-to-gateway measurements or prior to the averaging of the beacon-to-gateway measurements.

In some embodiments of the method, the position of the beacon is a first position that is transmitted, the beacon is moved, and the position of the beacon is a second position that is transmitted, the second position different than the first position.

Further described herein is an apparatus for locating a beacon in physical space, wherein the beacon communicates with at least one of a plurality of gateways in the physical space. In various embodiments, the apparatus comprises: a memory for storing a position of the beacon and at least one processor. The memory and the at least one processor are provided for: storing gateway-to-gateway measurements of power related to first signals transmitted between gateways located at respective physical locations; averaging the gateway-to-gateway measurements to obtain averaged gateway-to-gateway measurements; storing beacon-to-gateway measurements of power related to second signals transmitted between a beacon and one or more of the gateways; averaging the beacon-to-gateway measurements to obtain averaged beacon-to-gateway measurements; calculating first distances between the beacon and the gateways based on the averaged gateway-to-gateway measurements and the averaged beacon-to-gateway measurements; calculating second distances based on at least ones of the averaged beacon to gateway measurements and an expected measurement of power related to the beacon; and determining and storing the position of the beacon based on the second distances.

In some embodiments of the apparatus, the beacon is associated with a sensor for measuring an environmental related parameter.

In some embodiments of the apparatus, the first distances are Euclidean distances.

In some embodiments of the apparatus, the second distances are based on log distance propagation model.

In some embodiments of the apparatus, the position is displayed with the environmentally related parameter acquired by the sensor.

In some embodiments of the apparatus, the averaged gateway-to-gateway measurements are each a median.

In some embodiments of the apparatus, the averaged beacon-to-gateway measurements are each a mean.

In some embodiments of the apparatus, the gateway-to-gateway measurements of power that are stored are expected measurements of power at a distance from each of the gateways.

In some embodiments of the apparatus, the Euclidean distances are used to determine which of the averaged beacon-to-gateway measurements are used for calculating the second distances.

In some embodiments of the apparatus, at least one of: a) the gateway-to-gateway measurements; or b) the beacon-to-gateway measurements are normalized with each other prior to the averaging of the gateway-to-gateway measurements or prior to the averaging of the beacon-to-gateway measurements.

In some embodiments of the apparatus, the position of the beacon is a first position that is transmitted, the beacon is moved, and the position of the beacon is a second position that is transmitted, the second position different than the first position.

In some embodiments of the apparatus, the apparatus comprises a gateway, a beacon, a remote computing device, or any combination thereof.

BRIEF DESCRIPTION OF THE DRAWING

The disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and the drawing.

FIG. 3 is a diagram of a data structure for storing RSSI data associated with signals transmitted between gateways.

FIG. 5 is a diagram of a data structure for storing expected RSSI for the Measured Power of each beacon.

FIG. 6 is a diagram of a data structure for storing the mean of the RSSI values for each recipient gateway and sending gateway pair.

FIG. 7 is a diagram of a data structure for storing the signal value (RSSI) for the signal that each gateway receives from a beacon.

DETAILED DESCRIPTION

It should be understood that the phraseology and terminology used below for the purpose of description and should not be regarded as limiting. The use herein of the terms "comprising," "including," "having," "containing," and variations thereof are meant to encompass the structures and features recited thereafter and equivalents thereof as well as additional structures and features. Unless specified or limited otherwise, the terms "attached," "mounted," "affixed," "connected," "supported," "coupled," and variations thereof are used broadly and encompass both direct and indirect forms of the same. Further, "connected" and "coupled" are not restricted to physical or mechanical connections or couplings.

Figure 1:
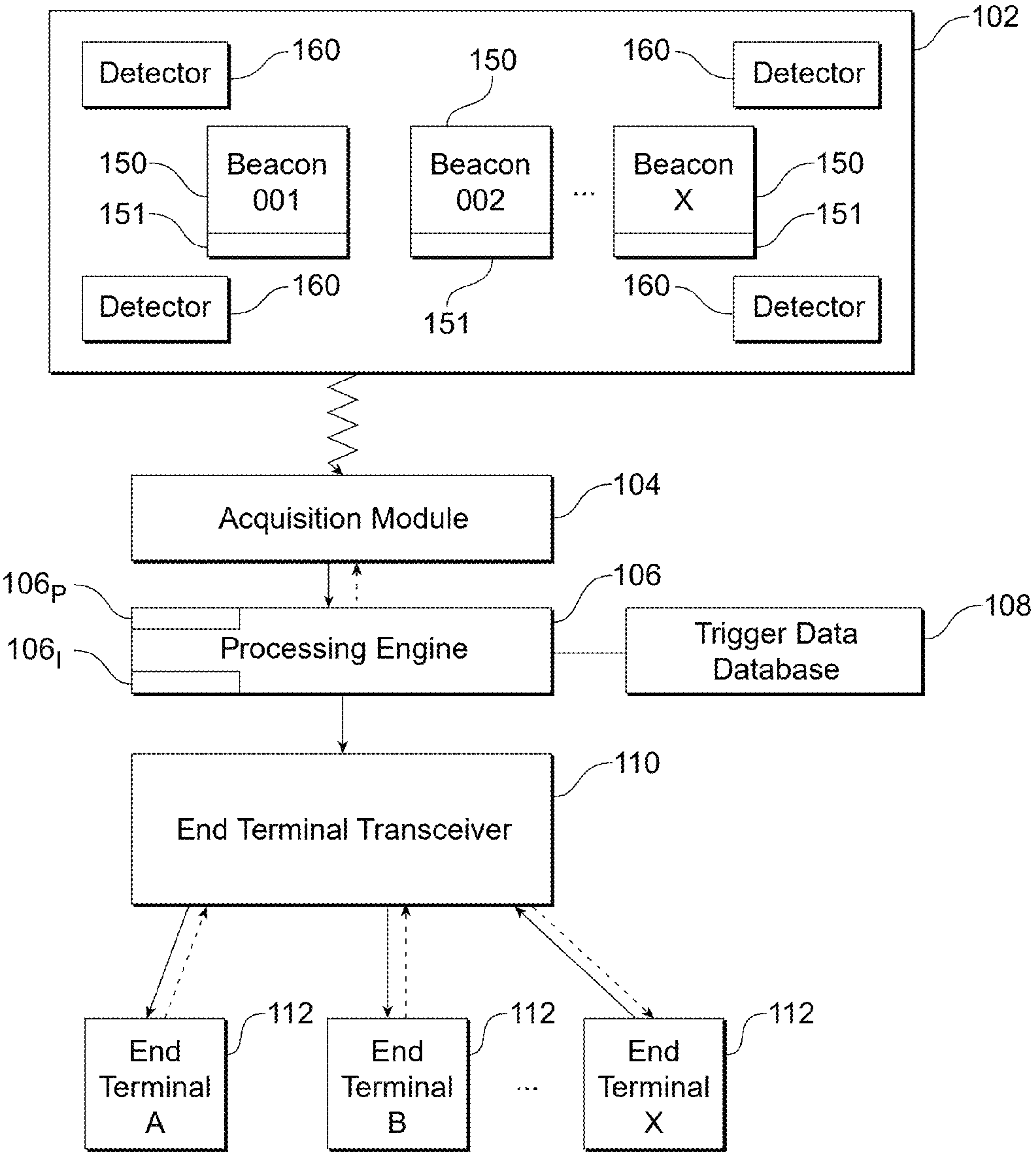
FIG. 1 is a block diagram that illustrates the operation of various components of an exemplary embodiment of a data acquisition management system.

FIG. 1 is a block diagram that illustrates the operation of various components of an exemplary embodiment of a data acquisition management system disclosed in U.S. patent application Ser. No. 17/951,678, the entire disclosure of which is incorporated herein by reference. In FIG. 1, various aspects of environment 102 are monitored. Environment 102 can take on a variety of different configurations. In one example, environment 102 includes a plurality of distinct physical locations in which data is monitored. In another example, environment 102 may be one physical location in which data is monitored. In another example, environment 102 is a portion of a larger area (such as rooms within a building or a department) in which data is monitored. Within environment 102 there are located one or more beacons 150.

The primary purpose of beacon 150 is to generate and transmit (broadcast) environmental or other data that represents the state of some measurement in the vicinity of the beacon 150. Beacon 150 can be a hardware device that transmits various data including, but not limited to temperature, humidity, time, altitude, location, or even empty packets, using a hardware radio and either an internal or external antenna, with the intent that the data will be received by another device (such as a gateway, mobile phone, computer, or another beacon).

In one exemplary embodiment, environment 102 may include numerous beacons 150 with respective identification values such as Beacon 001, Beacon 002 and Beacon X. Each beacon 150 is associated with a respective sensor 151 that monitors physical and/or process characteristics. Sensor 151 includes environmental sensors (heat, light, humidity, etc.) characteristics of a particular machine or person (vibration, noise, speed, acceleration, physiological characteristics, etc.) process sensors (to what extent have specific processes been completed and/or a simple "yes/no" as to whether a process has been complete), or other types of sensors. Each sensor 151 is monitoring one or more aspects of an environment (and/or the items therein). Thus, various people, objects, or environments (not shown in FIG. 1) are monitored by each sensor 151. Each sensor 151 is in proximity to what needs to be monitored (otherwise identified as an asset—not shown) so that monitoring of each asset can occur. Examples of assets are assets that affect environmental characteristics within environment 102. Examples of environmental characteristics include heat, air conditioning, humidity, atmospheric content (such as nitrogen, oxygen, carbon dioxide, etc.), light, etc. Assets thus may include air conditioners, gas regulators, pumps, etc. Another example of an asset is an asset that performs transportation such as a robot with independent locomotion, a drone, a conveyor belt, etc. Another example of an asset is an asset that performs an action desirable for manufacturing including manufacturing chamber pressure, manufacturing chamber humidity, manufacturing chamber temperature, ingredient dispensing, component placement, cutting, drilling, etc. For each beacon 150 associated with a sensor 151 (that measures the characteristics of one or more assets), each beacon 150 receives data from its associated sensor 151 and then transmits the received sensor data. The transmitted sensor data is then received by one or more detectors or gateways 160.

The primary purpose of gateway 160 is to receive broadcasted data and then transmit it to a device further up the network, such as a server. Gateway 160 can be any device that receives data from other devices (e.g., beacons), either over a wire or wirelessly, using an internal or external antenna, and then transmits that data (which may first be transformed, contextualized, or aggregated by the gateway) over a network to a server that may be either local or remote. During normal operation, a gateway may operate as a beacon, in that it can generate and transmit its own data for other gateways to receive. A gateway that operates as a beacon can be a standalone device, built to operate as a gateway, or a mobile device such as a phone or tablet running software to perform typical gateway and beacon operations.

Beacons 150 and gateways 160 may be part of one or more networks in order to facilitate transfer of sensor data. Sensor data may be transmitted from beacon(s) 150 to gateway(s) 160 at regular intervals, at changing intervals, responsive to a signal received from gateway 160, when a beacon is activated by a sensor 151 detecting a characteristic which results in subsequent activation of beacon 150, etc.

In one example, beacon 150 transmits temperature measured by sensor 151. The temperature may be temperature internal to an asset, the temperature of a manufacturing chamber in which an asset is affecting the environment of the manufacturing chamber, completion of a manufacturing step by one or more assets, completion of an interim manufacturing step by one or more assets, or some other aspect of an asset including vibration, injection, current, voltage, power, etc. In another example, sensor 151 is not associated with a specific asset (e.g., it measures temperature in a room) and beacon 150 transmits the temperature measured by sensor 151 within the room. In another example, sensor data that is transmitted by beacon 150 is used to identify the location of sensor 151 and/or location of an asset associated with sensor 151 (e.g. moving sensor 151 and its associated asset a greater distance than is permitted, moving sensor 151 and its associated asset at a greater speed than it is permitted, moving sensor 151 and its associated asset so that the associated asset is unacceptably close to another asset, something potentially harmful, a human being, etc.).

Beacon 150 transmits data that is received by gateway 160. In one embodiment, a single gateway 160 may be included for receiving data from beacon 150. In another example, a plurality of gateways 160 are used and beacon 150 communicates with one or more of multiple gateways 160. When beacon 150 communicates with a plurality of gateways 160, the plurality of gateways 160 may have one or more functions. In one example, beacon 150 communicates with one gateway 160 that has the strongest signal with beacon 150. In another example, communication with beacon 150 may be based on physical proximity of beacon 150 and gateway 160. In another example, beacon 150 may be within a specific area associated with gateway 160. In another example, multiple gateways 160 acquire the signal from beacon 150 in order to identify the location of beacon 150.

Beacon 150 may communicate with gateway 160 using a variety of different signaling protocols that are known to one of ordinary skill in the art including Wi-Fi, Bluetooth, cellular, NFC, optical signaling, audio, etc. Communication may occur using one or more protocols that are known to one of ordinary skill in the art including iBeacon, Eddystone, etc. In another example, the signal strength of signals received by multiple gateways 160 is triangulated in order to identify the location of module 150. Further examples of location identification may be used such as GPS, RFID, etc.

The data that is transmitted by each beacon 150 is received by one or more gateways 160. A subsequent transmission occurs from one or more gateways 160 to acquisition module 104. In one example, gateway 160 simply passes along one or more sensor data values that it has received from beacon 150. In another example, gateway 160 separately, alternately, or in addition transmits information associated with the signal that gateway 160 receives from beacon 150. One such characteristic is signal strength. Another such characteristic is location data.

Acquisition module 104 comprises one or more interfaces. Each interface is specifically configured for capturing data from a particular type of sensor 151 associated with the interface. In an exemplary embodiment, the acquisition module 104 preprocesses the sensor data (preliminary aggregation of the sensor data) it receives from each gateway 160 and transmits the preprocessed data to a processing engine 106 having a location processor 106*r* for determining the location of a beacon 150 and a user interface 1061. In another exemplary embodiment, the acquisition module 104 determines the location of each beacon from which it has received data. In another exemplary embodiment, the receiving gateway preprocesses the sensor data and the acquisition module 104 aggregates data. Processing engine 106 uses the data received from acquisition module 104 in combination with various tables to take corrective action to assets and/or to provide further data. Exemplary tables (trigger data files) are included in trigger data database 108 and are further described below.

In an exemplary embodiment, the acquisition module 104, processing engine 106, and trigger data database 108 can be located remote from the environment 102 and accessible via the Internet or other network. In another embodiment, the acquisition module 104, processing engine 106, and trigger data database 108 can be located in the environment 102. In still another embodiment, one or more of the acquisition module 104, processing engine 106, and trigger data database 108 can be located remote from the environment 102 and accessible via Internet or other network, while the other one or more of the acquisition module 104, processing engine 106, and trigger data database 108 can be located in the environment 102. For example, the acquisition module 104 can be located in the environment 102 and the processing engine 106 and trigger data database 108 can be located remote from the environment 102 and accessible via the Internet or other network. In another example, the acquisition module 104 and processing engine 106 can be located in the environment 102 while the trigger data database 108 can be located remote from the environment 102 and accessible via the Internet or other network.

Trigger alerts, status of sensors, status of assets, status of processes or other data that is generated by processing engine 106 is forwarded to end terminal transceiver 110. End terminal transceiver may be provided with instructions (e.g., identification of an end terminal) to receive the output of processing engine 106. End terminal transceiver 110 then forwards processed data to end terminal 112. FIG. 1 illustrates that there may be multiple end terminals A, B, X, etc. End terminal 112 can be a user device (such as a phone, computer, etc.), a virtual terminal (such as an email address or text message address), a physical alarm (such as a siren, light, etc.), a protective device (an on/off switch for an asset), some type of storage (a database, cloud storage, etc.) or some other physical or virtual receiver that receives processed data.

Figure 2A:
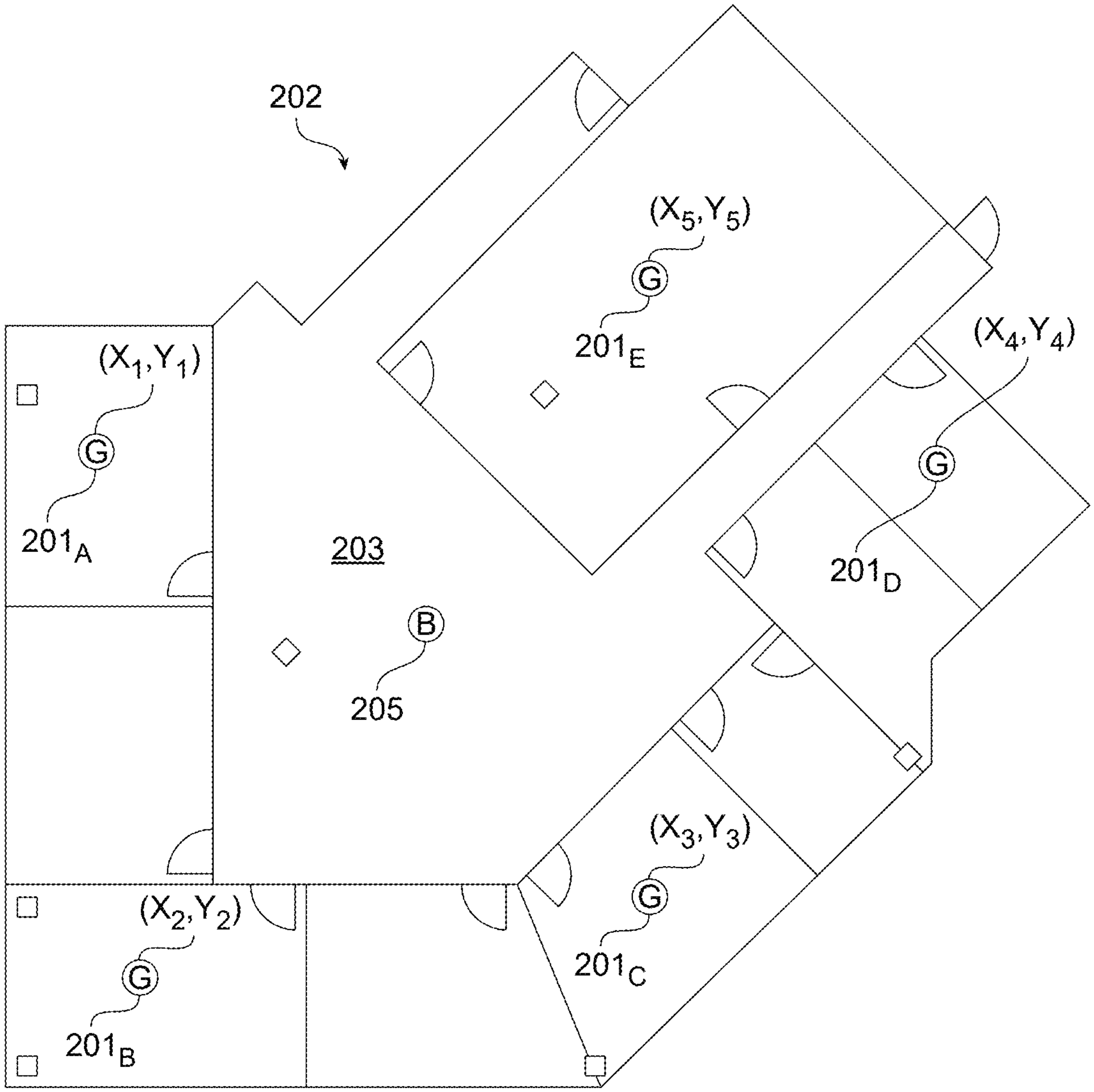
FIG. 2A is a block diagram of an exemplary embodiment of an environment having a plurality of gateways and a plurality of beacons disposed in a map area.

FIG. 2A is a block diagram that illustrates an exemplary embodiment of an environment 202 (e.g., a building) having a plurality of gateways 201$_{A-E}$ disposed in map area 203. Although five gateways 201 are shown in FIG. 2A, the actual number of gateways may be more than five or less than five. The location of each gateway 201$_{A-E}$ is known. In one embodiment, the location of each gateway is known through one or more methods described in U.S. patent application Ser. No. 17/951,678, or using methods known to a person of ordinary skill in the art. In several exemplary embodiments, the location of each gateway is known based on each gateway being positioned relative to position markings on the floor (or other supporting surface). In other embodiments, the locations are measured with physical measuring devices (ruler, tape measure, laser, optical systems, image recognition, etc.).

During actual operation, beacons are located in map area 203. An exemplary beacon 205 is illustrated in FIG. 2A. The actual number of beacons present may be more than what is shown in FIG. 2A. Furthermore, the location of beacon 205 shown in FIG. 2A is merely exemplary.

Gateways 201$_{A-E}$ transmit signals and one or more gateways 201$_{A-E}$ may receive a gateway transmitted signal. Thus, gateways 201$_{A-E}$ send signals to each other. Each sending gateway 201$_{A-E}$ transmits a signal, and any gateways 201$_{A-E}$ within reception range of the transmitted signal may receive the transmitted signal. When one of the gateways 201$_{A-E}$ receives a signal from one of the gateways 201$_{A-E}$ or beacon 205, that gateway 201$_{A-E}$ processes the received signal to determine or measure a Received Signal Strength Indicator (RSSI) associated with the received signal and stores the RSSI. When a beacon 205 sends out a packet of information, the RSSI is a measurement that indicates the strength of the signal received by the gateway 201$_{A-E}$. The further away the beacon 205 is from a gateway 201$_{A-E}$, the weaker the signal. The closer a beacon is to a gateway 201$_{A-E}$, the stronger the signal.

RSSI is known in the art. RSSI is further described in Wikipedia by searching under "Received Signal Strength Indication."

Referring still to FIG. 2A, gateways 201$_{A-E}$ are located in respective known locations. Each gateway 201$_{A-E}$ is transmitting signals. Signals may include a tag that identifies the gateway transmitting each respective signal. Signals may be transmitted at multiple frequencies, including frequencies suitable for Bluetooth, Wi-FI, cellular, or in frequencies associated with other signaling formats. If a signal from one gateway reaches another gateway, the RSSI associated with that signal is measured and stored. In one embodiment, the RSSI is stored in the gateway 201$_{A-E}$ that received the measured signal for later retrieval. In another embodiment, the RSSI is transmitted to a remote location for subsequent processing (e.g., by the location processor 106P of processing engine 106 in FIG. 1). Subsequent processing involves aggregating all the RSSI received.

As an example, gateway 201$_D$ transmits a signal, and the transmitted signal is received by gateway 201$_B$, gateway 201$_c$, and gateway 201$_E$. The following information may then be stored (at one of several possible locations): timestamp indicating when the signal was received, sending gateway, recipient gateway, RSSI. In this example, no data is stored for gateway $201_A$, as gateway $201_A$ did not receive the signal transmitted from gateway $201_D$. FIG. 3 depicts an exemplary table that includes the above information. While not shown, other exemplary information may be transmitted, received, and stored as well, such as information relating to one or more characteristics of a gateway, data received from a beacon that is communicating with a gateway, etc.

Figure 2B:
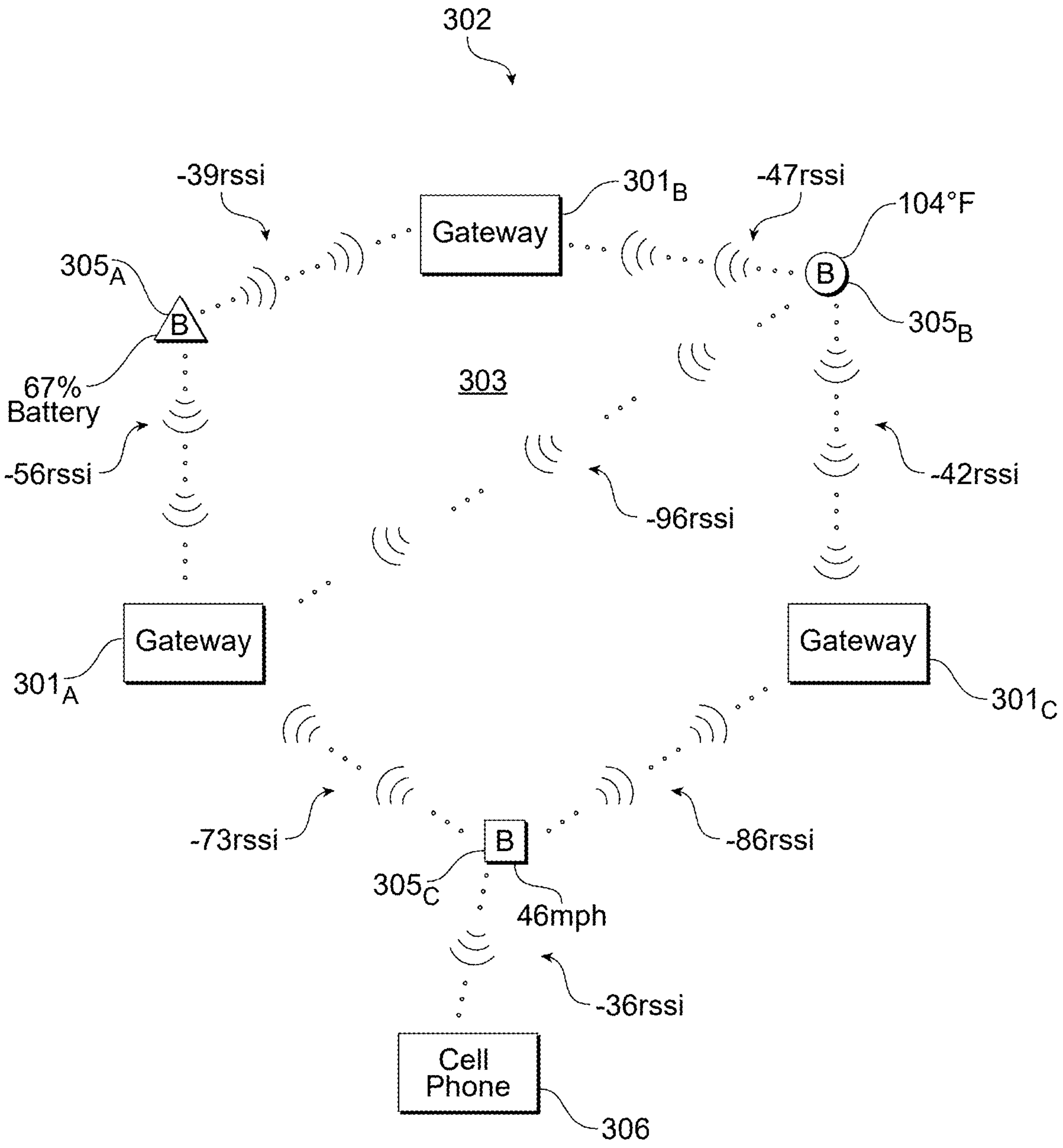
FIG. 2B, is a block diagram of another exemplary embodiment of an environment having a plurality of gateways and a plurality of beacons disposed in a map area.

FIG. 2B, is a block diagram that illustrates another exemplary embodiment of an environment 302 having a plurality of gateways $301_{A-C}$ and a plurality of beacons $305_{A-C}$ disposed in map area 303. As illustrated, beacons $305_{A-C}$ broadcast data in a multidirectional manner to anything that can receive (hear) their broadcast. At the same time, the gateways $301_{A-C}$ are always listening for beacon packets. The gateways can be gateways 160 which are part of the data acquisition management system of FIG. 1, gateways belonging to a third party (not shown), and/or a cell phone 306 and the like.

Figure 4:
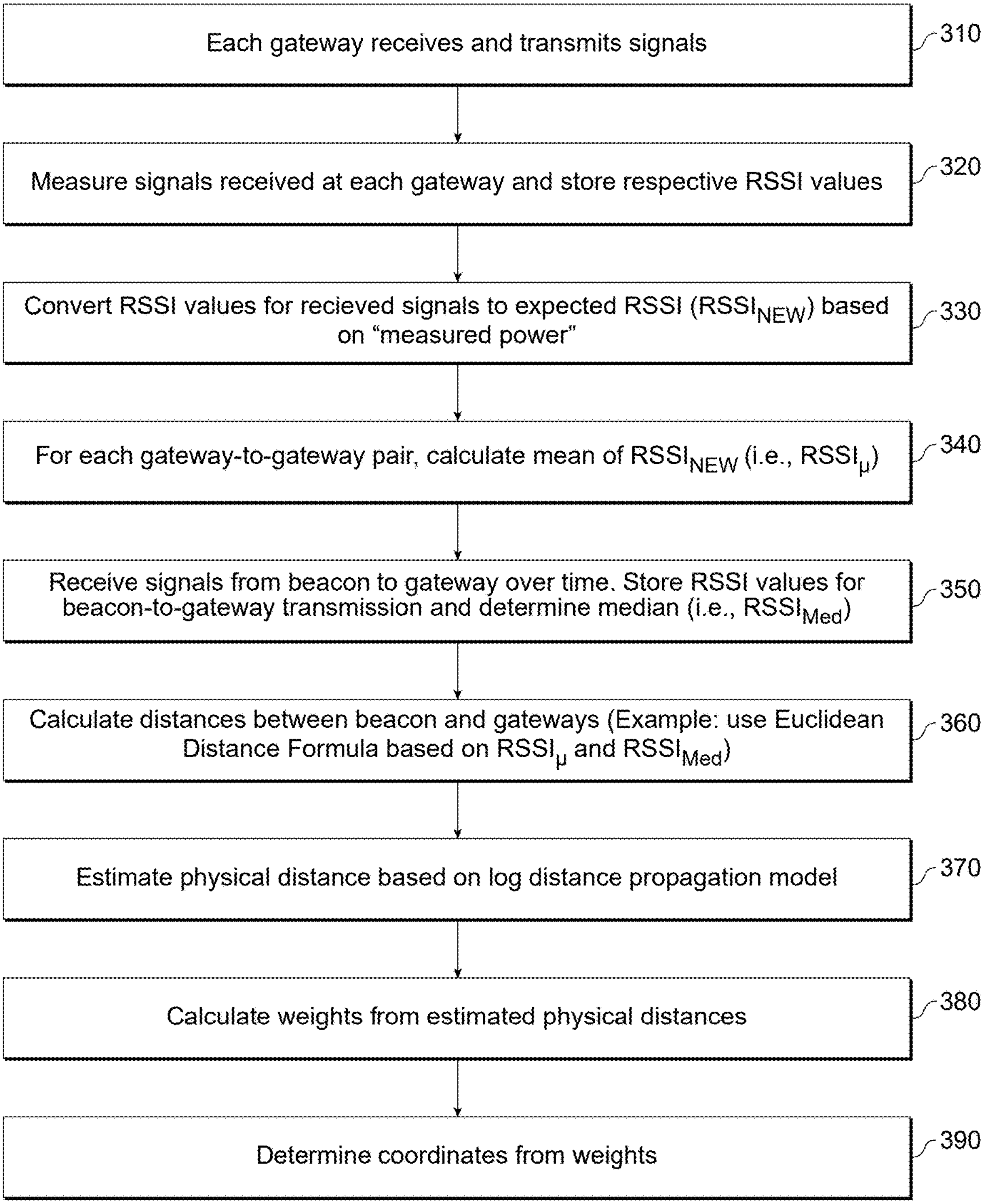
FIG. 4 is a flow chart diagram that illustrates identification of the location of a beacon in accordance with an exemplary embodiment of the present disclosure.

FIG. 4 is a flow chart that illustrates operation of an exemplary embodiment of the present disclosure. A summary of the steps included in FIG. 4 will be provided first (with reference to the gateways $201_{A-E}$ and beacon 205 of FIG. 2 for illustrative purposes only). Then, a more detailed description of an exemplary embodiment that corresponds to FIG. 4 will be provided with references to the steps illustrated therein.

At step 310, each gateway $201_{A-E}$ transmits and receives signals. At step 320, the RSSIs associated with the signals received at each gateway $201_{A-E}$ are measured by the receiving gateway $201_{A-E}$ and the respective RSSI values are stored in the receiving gateway $201_{A-E}$. At step 330, the RSSI values for the received signals are converted to expected RSSI values ($RSSI_{NEW}$) by the receiving gateway $201_{A-E}$ based on "Measured Power" (defined below). At step 340, for each gateway-to-gateway pair, the mean of $RSSI_{NEW}$ (i.e., $RSSI_\mu$) is calculated. At step 350, signals are received from beacon 205 to gateways $201_{A-E}$ over time. The RSSI values for beacon-to-gateway transmission are stored and the median is determined (i.e., $RSSI_{Med}$). In some exemplary embodiments, the receiving gateways $201_{A-E}$ transmit the RSSIs to the acquisition module 104 and the processing engine 106 of FIG. 1, to calculate/determine the mean of $RSSI_{NEW}$ (i.e., RSSI) and the median (i.e., $RSSI_{Med}$), and to aggregate this data. In other exemplary embodiments, the receiving gateways $201_{A-E}$. calculate/determine the mean of $RSSI_{NEW}$(i.e., $RSSI_\mu$) and the median (i.e., $RSSI_{Med}$). At step 360, the distances between beacon 205 and gateways $201_{A-E}$ are calculated. In an exemplary embodiment of the present disclosure, the Euclidean Distance Formula is used based on $RSSI_\mu$ and $RSSI_{Med}$. At step 370, physical distance between beacon 205 and gateways $201_{A-E}$ are estimated based on, for example, a log distance propagation model. At step 380 weights are calculated from the estimated physical distances in step 380. At step 390, the coordinates of beacon 205 (or each beacon if more than one) is/are determined based on the weights. In an exemplary embodiment, steps 360, 370, 380, and 390 are performed by the acquisition module 104 and the processing engine 106 of FIG. 1.

A more detailed explanation of the flow chart diagram of FIG. 4, which illustrates the identification of the location of a beacon, along with some examples, are now provided.

As described above, in step 310, each gateway $201_{A-E}$ transmits and attempts to receive signals from other gateways $201_{A-E}$. At step 320, the RSSIs for gateway-to-gateway transmissions are measured by each receiving gateway $201_{A-E}$ (i.e., measurements of power related to transmitted signals). As explained above, in some situations a transmission from one gateway to another gateway may not be received. Each RSSI measured by the receiving gateway $201_{A-E}$ may be referred to as $RSSI_G$ (or RSSI sub G, or RSSI Gateway) and is stored in the receiving gateway $201_{A-E}$. At step 330, each $RSSI_G$ is converted to the expected RSSI for the Measured Power of each beacon by the receiving gateway $201_{A-E}$ (i.e., measurements of power related to transmitted signals). Measured Power (MP) is the RSSI value that is "expected" at a distance of 1 meter (for example) from each beacon 205. The term "expected" refers to a theoretical value under perfect conditions. In practice, each gateway $201_{A-E}$ is subject to a potentially large amount of interference that affects signal strength. Thus, even if a beacon is 1 meter from a gateway and stays stationary, for the period during which RSSI values are measured and collected, the values actually measured and collected will fluctuate. The expected RSSI may be referred to as $RSSI_{NEW}$ (or RSSI sub NEW).

In other words, if the MP is increased, then RSSI is expected to be stronger at 1 meter from gateway. If a beacon's MP is decreased, then the RSSI is expected to be weaker at 1 meter from the gateway.

Thus, the receiving gateway $201_{A-E}$ converts the RSSI gateway values to $RSSI_{NEW}$ values for each beacon 205. If the Measured Power is the same, the RSSI values will remain unchanged. In other words, If $MP_G=MP_B$ then $RSSI_G$ will not change. Since the Measured Power is the same, the RSSI values are already imitating the expected RSSI values of the beacon vs the gateway. This can be proven in the conversion formula by assuming that the MP for both beacon and gateway are equal. This will result in $RSSI_{New}$ being the same as $RSSI_G$.

The conversion is accomplished based on the Measured Power of each gateway $201_{A-E}$, the Measured Power of each beacon 205, and optional environmental factors (such as factors related to interference). The Measured Power of each gateway $201_{A-E}$ and the Measured Power of each beacon 205 may be obtained by actually measuring power transmitted from each gateway $201_{A-E}$ and each beacon 205 at a distance of 1 meter from each. In making the calculation, an environmental factor can be applied that relates to the gateway $201_{A-E}$ and an environmental factor can be applied that relates to the beacon 205. The environmental factors can include various forms of interference, such as: walls, machinery, human foot traffic, high humidity, electromagnetic interference, etc. In one non-limiting embodiment, the value of an environmental factor can be 0.95, 1 (no interference), 1.05 (some interference), etc. The environmental factors can be empirically obtained (i.e. by real world experimentation and experience). The following variables and equation may be used to calculate $RSSI_{NEW}$:

$MP_G$—Measured Power Gateway
$MP_B$—Measured Power Beacon
$N_G$—Environmental Factor Gateway
$N_B$—Environmental Factor Beacon
$RSSI_G$—RSSI Gateway $$RSSI_{New} = MP_B - \left(\frac{N_B}{N_G} * (MP_G - RSSI_G)\right)$$

$RSSI_{NEW}$ values are calculated and stored over time by each gateway $201_{A-E}$. Exemplary $RSSI_{NEW}$ values are illustrated in the data structure illustrated in FIG. 5.

Referring again to FIG. 4, one way to think of the above $RSSI_{NEW}$ calculation is in view of the fact that RSSI measurements for gateways $\mathbf{201}_{A-E}$ are calibrated, RSSI measurements for beacons 205 are calibrated, and the calibration of gateways $\mathbf{201}_{A-E}$ and beacons 205 may not be the same. This may particularly be the case when gateways $\mathbf{201}_{A-E}$ operate off of electricity from a wired electrical source (i.e., "plugged in") and when beacons 205 operate off of batteries (so that they are mobile/portable). Generating $RSSI_{NEW}$ effectively normalizes the relationship between RSSI values generated from transmissions by beacons 205 and RSSI values generated from transmissions by gateways $\mathbf{201}_{A-E}$.

Based on the exemplary data in the data structure illustrated in FIG. 5, the mean (average) of the $RSSI_{NEW}$ values ($RSSI_\mu$) for each sending gateway-receiving gateway pair are calculated in step 340 of FIG. 4. To restate, RSSI values are measured from gateway-to-gateway pairs. These RSSI values are converted $RSSI_{NEW}$, which is the value the RSSI would have been if it had the measured power of the beacon 205 we will be calculating the location of. The resulting $RSSI_{NEW}$ values are then averaged, using the calculation that follows, resulting in $RSSI_\mu$ (the calculation is a simple average written mathematically):

$$RSSI_\mu = \frac{1}{N}\sum_{N=1}^{N} RSSI_n$$

A gateway pair with no observations (excluding a gateway to itself), can result in a $RSSI_\mu$ value of, for example, −110. The $RSSI_\mu$ value "−110" is selected empirically. In particular, various values are tried and the $RSSI_\mu$ value "−110" is found to be optimal. If the lowest an RSSI value is, for example, −99, if the signal did reach a gateway, then a value of −110 is selected to numerically represent an $RSSI_\mu$ value that did not reach a gateway. Any gateway to itself is given an $RSSI_\mu$ value of, for example, −43. The $RSSI_\mu$ value "−43" is also selected empirically through trial and error. For example, if a beacon is adjacent (right next to) a gateway (0 meters between the gateway and beacon) then the RSSI value can be approximately "−43". These values are exemplary and may be modified based on further research. Specifically, the $RSSI_\mu$ value −110 can be modified if a better $RSSI_\mu$ value is determined to represent an RSSI value that "did not reach the gateway" and the $RSSI_\mu$ value −43 can be modified if stronger beacons are used (in that case the $RSSI_\mu$ value would be raised) or weaker beacons are used (in that case the $RSSI_\mu$ value would be lowered).

For example, if gateway $\mathbf{201}_A$ sends out 10 signals in a designated period and 7 of the 10 signals actually reach gateway $\mathbf{201}_B$, the mean value of gateway $\mathbf{201}_B$ receiving signals from gateway $\mathbf{201}_A$ would be the sum of the 7 stored RSSI values plus 3×−110 divided by 10 ("3×−110" because 3 signals did not reach gateway $\mathbf{201}_B$ in the example).

Since a gateway will never receive its own signal, the stored $RSSI_\mu$ value can be −43 for the gateway to itself (gateway $\mathbf{201}_A$ to gateway $\mathbf{201}_A$, gateway $\mathbf{201}_B$ to gateway $\mathbf{201}_B$, etc.). The −43 value and values similar to this such as −30, −41, −47 and the like, indicates that this value is gateway's own signal.

The $RSSI_\mu$ for each gateway/gateway pair is then stored. An example of a table storing this data appears in the data structure illustrated in FIG. 6.

Referring to step 350 of FIG. 4, next, an online beacon (e.g., beacon 205 in FIG. 2A) in the map area (e.g., map area 203 in FIG. 2A) sends out signals. The signal sent by a beacon (e.g., beacon 205 in FIG. 2A) may be a test signal and/or may include data associated with a beacon such as beacon identification, identification of sensor(s) associated with a beacon, data collected by sensor(s), etc. Each gateway (e.g., gateway $\mathbf{201}_{A-E}$) receiving a signal from the beacon 205 stores the signal value (RSSI). If a signal does not reach a gateway $\mathbf{201}_{A-E}$, an RSSI value of −110 is stored. For example, if beacon 205 sends out a signal that reaches gateway $\mathbf{201}_A$, gateway $\mathbf{201}_c$, gateway $\mathbf{201}_D$, and gateway $\mathbf{201}_E$ but does not reach gateway $\mathbf{201}_B$, then the RSSI values received for gateway $\mathbf{201}_A$, gateway $\mathbf{201}_c$, gateway $\mathbf{201}_D$, and gateway $\mathbf{201}_E$ are stored as received and gateway $\mathbf{201}_B$ stores a value of −110, as illustrated in FIG. 7.

The beacon to gateway signals are recorded over a short period of time (typically, but not limited to a period of 30 seconds to 5 minutes). From these stored RSSI values for each receiving gateway $\mathbf{201}_{A-E}$ from the beacon 205 (or from each beacon if there are multiple beacons), the median (average) $RSSI_{Med}$ is calculated.

Received Values (ordered Lowest to Highest)=[$RSSI_0$, $RSSI_1$, $RSSI_2$, $RSSI_3$, $RSSI_4$]=>$RSSI_{Med}$=$RSSI_2$.

At step 350, for each receiving gateway $\mathbf{201}_{A-E}$ in the map area 203 of the beacon 205 of interest, the $RSSI_{Med}$ is stored in that gateway. In the example above $RSSI_2$ is stored. This value is compared to the aggregate converted RSSI values from the gateway pairs ($RSSI_\mu$), as described in detail below.

Referring now to step 360 of FIG. 4, the distance between the stored $RSSI_\mu$ values and the collected beacon $RSSI_{Med}$ values is calculated at each point of reference j using the Euclidean Distance Formula.

An example of the calculation performed in step 360 of FIG. 4 is as follows. Assume two gateways (reference points), gateway $\mathbf{201}_A$ and gateway $\mathbf{201}_B$, with stored $RSSI_\mu$ values for each gateway $\mathbf{201}_A$ and $\mathbf{201}_B$. Gateway $\mathbf{201}_A$ to itself will have a RSSI value of −43, and assume the signals received from gateway $\mathbf{201}_B$ to gateway $\mathbf{201}_A$ average out to an $RSSI_\mu$ value of −70. Gateway $\mathbf{201}_B$ to itself will have an $RSSI_\mu$ value of −43, and assume the signals received from gateway $\mathbf{201}_A$ to gateway $\mathbf{201}_B$ average out to an $RSSI_\mu$ value of −72.

Now assume that beacon 205 sends signals to gateways $\mathbf{201}_A$ and $\mathbf{201}_B$. The median value of the RSSI signals ($RSSI_{MED}$) gateway $\mathbf{201}_A$ received from beacon 205 is −55, and the median value of the RSSI signals ($RSSI_{MED}$) gateway $\mathbf{201}_B$ received from beacon 205 is −68. From knowledge of RSSI values, a person of ordinary skill in the art already knows that beacon 205 is closer to gateway $\mathbf{201}_A$ than to gateway $\mathbf{201}_B$, but this fact can also be shown mathematically.

The Euclidean Distance Formula is as follows:

$$D_j = \sqrt{\sum_{i=1}^{m} (RSSI_{i\ Med} - RSSI_{i\ \mu})^2}$$

where i is the number of gateways ranging from 1 to m stored values in the map area 203. $D_j$ is sorted in ascending order.

Plugging in the above hypothetical values, the following distances are obtained:

$$D \text{ of } 201_A = \sqrt{(-43 - -55)^2 + (-70 - -68)^2} = 12.1655$$

-continued $$D \text{ of } 201_B = \sqrt{(-72 - -55)^2 + (-43 - -68)^2} = 30.2324$$

As can be seen, the assumption that would be made by a person of ordinary skill in the art can be demonstrated mathematically. The Euclidean Distance from comparing values shows that the beacon 205 is closer to gateway (reference point) 201$_A$.

The reference points (gateways 201$_{A-E}$) with the "m" lowest values for $D_j$ are then selected ("m" is arbitrary; in the exemplary embodiment above, 2 values are selected, in other embodiments more than 2 values may be selected).

In step 370, the $RSSI_{MED}$ values and (x,y) coordinates are referenced from the "m" (e.g. 2) selected gateways 201$_A$ and 201$_B$. Estimated physical distance, d, is calculated for each gateway 201$_A$ and 201$_B$ using the log distance propagation model:

$$d_i = 10 \wedge \frac{(MP - RSSI_{Med})}{(10 * N)}$$

where 10 is in dBs (decibels), MP is the measured power in dBms (decibel-milliwatts) of the beacon and N is a constant depending on environmental factors.

From the example above using gateway 201$_A$ and gateway 201$_B$. Gateway 201$_A$ median ($RSSI_{MED}$) can be −55 and gateway 201$_B$ median can be −68. If MP is −70 dBm, N is 1, and the median values −55 and −68 are used in the formula above the resulting distances are:

$$d \text{ of } 201_A = 0.2511 \text{ meters}$$

$$d \text{ of } 201_B = 0.5012 \text{ meters}$$

Next in step 380 of FIG. 4, a weight w is calculated and assigned using the distance, d, calculated above. The weight is the inverted distance to a degree g.

$$W_i = \frac{1}{d_i^g}$$

The calculation will now be performed as an example. Assume the degree g is 1 for simplicity purposes.

$$W \text{ of } 201_A = 1/0.2511 = 3.9825$$

$$W \text{ of } 201_B = 1/0.5012 = 1.9952$$

In step 390 of FIG. 4, the weights are used to determine the coordinates $x_w$, $y_w$ of the beacon 205 using the following formula:

$$x_w = \sum_{i=1}^{m} x_i * \frac{w_i}{\sum_{i=1}^{m} w_i}$$

-continued $$y_w = \sum_{i=1}^{m} y_i * \frac{w_i}{\sum_{i=1}^{m} w_i}$$

The final estimated location is thus ($x_w$, $y_w$).

For example, assume that gateway 201$_A$ is at coordinates (10, 50) and gateway 201$_B$ is at coordinates (20, 30).

Sum of the weights = 3.9825 + 1.9952 = 5.9777

$$x_w = (10 * (3.9825/5.9777)) + (20 * (1.9952/5.9777)) = 13.34$$

$$y_w = (50 * (3.9825/5.9777)) + (30 * (1.9952/5.9777)) = 43.32$$

Final estimated coordinates of beacon 205: (13.34, 43.32)

The above examples have included the use of RSSI, but it is understood that other data may be used in addition to or in place of RSSI to perform calculations for determining beacon position. Such alternative data may be used to determine distance between gateways and/or between gateways and beacons. One example of an alternative to RSSI is to use received channel power indicator (RCPI). It is understood to a person of ordinary skill in the art that the use of RSSI is merely exemplary.

The present disclosure thus achieves numerous technical improvements over the prior art. For example, in some prior art symptoms, locating the position of a beacon-like device (by itself or associated with one or more sensors) could be a relatively slow process. In some systems, identifying the location of a beacon-like device could be delayed for an undesirable time period. An exemplary unacceptable time period could be 30 seconds. In any system in which knowing the location of such beacon-like devices is either desirable or important, a delay in identifying the position may be unacceptable. Such a disadvantageous situation may be compounded in a system in which multiple beacon-like devices are present. If it is desirable or important for location of multiple ones (or all) of these beacon-like devices to be known in real time, the delays in determining location of those devices can compound problems.

Part of the need for real-time identification of beacon-like device locations derives from the fact that beacon like devices may be movable, and/or beacon-like devices are associated with sensors and/or equipment that is movable. When such beacon-like devices (with or without the associated sensors or equipment) are moved, the devices transition from being in a known location to being in an unknown location—until the new location has been determined.

In some situations, for example, knowing the location of beacon-like devices in real-time can be critical. One example where such criticality may be important is an emergency health care setting in which such beacon-like devices are associated with life saving equipment. If a patient were to go into cardiac arrest for example, a 30 second delay in identifying the location of a defibrillator would be unacceptable. Another example would be a manufacturing facility in which one piece of equipment is used with a material that is considered a contaminant to a segregated area of a production facility. An example would be a food production facility in which allergens (wheat, peanuts, soy, etc.) must be segregated from allergen-free production areas. If that piece of equipment used with an allergen were to inadvertently be moved to a zone designated as being allergen free, the repositioning is desirably identified as quickly as possible to minimize contamination (and minimize subsequent remediation).

The present disclosure that provides the ability to identify location of such beacon-like devices in real time. By significantly reducing the delay in identifying a changed location to a beacon-like device, the above desirable advantages are achieved. In addition, the above-described features of the disclosure enable the location of a repositioned beacon-like device to be identified with desirable accuracy concurrently with location information being provided in real time.

Another technical improvement achieved by the present disclosure is that fact that location of beacon-like devices can be achieved in real time without the need to modify, replace, or add to hardware that is found in many location identification systems. Some current systems may thus be eligible for software upgrades that enable location identification of beacon-like devices to be achieved in real time.

In an exemplary embodiment of the present disclosure, a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

The processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

The computer system may further include a network interface device. The computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

The data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

The machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Various exemplary embodiments are described above. It is understood that exemplary embodiments (or portions thereof) described above may be combined without limitation to yield further exemplary embodiments of the present disclosure.

The above examples include transmitting data between devices (such as between gateways and beacons). It is understood that devices such as gateways may be receiving data from respective servers, and it is contemplated that transmitting data may be accomplished by transmitting data to/from one or more of the respective servers.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The apparatus for performing the operations described herein can comprise a gateway, beacon, and/or one or more remotely located or locally located computing devices such as one or more servers (processing engine 106 of FIG. 1). This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method for locating a physical position of a beacon in a physical space, wherein the beacon communicates with at least one of a plurality of gateways in the physical space, the method comprising the steps of:

transmitting first signals between gateways located at respective physical locations;

storing gateway-to-gateway measurements of power related to the first signals;

averaging the gateway-to-gateway measurements to obtain averaged gateway-to-gateway measurements;

transmitting second signals between the beacon and one or more of the gateways;

storing beacon-to-gateway measurements of power related to the second signals;

averaging the beacon-to-gateway measurements to obtain averaged beacon-to-gateway measurements;

calculating first distances between the beacon and the gateways based on the averaged gateway-to-gateway measurements and the averaged beacon-to-gateway measurements;

calculating second distances between the beacon and the gateways based on at least ones of the averaged beacon to gateway measurements and an expected measurement of power related to the beacon, wherein the first distances are used to select the at least ones of the averaged beacon to gateway measurements used for the calculating of the second distances;

determining and storing the position of the beacon based on the second distances;

transmitting the physical position of the beacon so that the physical position is subsequently displayed.

2. The method of locating a physical position of a beacon in a physical space according to claim 1, wherein the beacon is associated with a sensor for measuring an environmental related parameter.

3. The method of locating a physical position of a beacon in a physical space according to claim 2, wherein the position is displayed with the environmentally related parameter acquired by the sensor.

4. The method of locating a physical position of a beacon in a physical space according to claim 1, wherein the first distances are Euclidean distances.

5. The method of locating a physical position of a beacon in a physical space according to claim 1, wherein the second distances are based on a log distance propagation model.

6. The method of locating a physical position of a beacon in a physical space according to claim 1, wherein the averaged gateway-to-gateway measurements are each a median.

7. The method of locating a physical position of a beacon in a physical space according to claim 1, wherein the averaged beacon-to-gateway measurements are each a mean.

8. The method of locating a physical position of a beacon in a physical space according to claim 1, wherein the gateway-to-gateway measurements of power that are stored are theoretical values of power at a distance from each of the gateways under perfect conditions.

9. The method of locating a physical position of a beacon in a physical space according to claim 1, wherein the first distances are used to determine which of the at least ones of the averaged beacon-to-gateway measurements are used for calculating the second distances.

10. The method of locating a physical position of a beacon in a physical space according to claim 1, wherein at least one of:

a) the gateway-to-gateway measurements; or b) the beacon-to-gateway measurements are normalized with each other prior to the averaging of the gateway-to-gateway measurements or prior to the averaging of the beacon-to-gateway measurements.

11. The method of locating a physical position of a beacon in a physical space according to claim 1, wherein the physical position of the beacon is a first physical position that is transmitted, wherein if the beacon is moved to another physical position, the another physical position of the beacon is a second physical position that is transmitted, the second physical position being different from the first physical position.

12. An apparatus for locating a physical position of a beacon in a physical space, the apparatus comprising:

a plurality of gateways located at respective physical locations, the plurality of gateways for transmitting first signals therebetween, wherein one or more of the plurality of gateways are for receiving second signals transmitted by the beacon;

a computer system comprising:

a memory for storing a position of the beacon; and at least one processor for:

storing gateway-to-gateway measurements of power related to the first signals transmitted between gateways located at the respective physical locations;

averaging the gateway-to-gateway measurements to obtain averaged gateway-to-gateway measurements;

storing beacon-to-gateway measurements of power related to the second signals transmitted between the beacon and the one or more of the gateways;

averaging the beacon-to-gateway measurements to obtain averaged beacon-to-gateway measurements;

calculating first distances between the beacon and the gateways based on the averaged gateway-to-gateway measurements and the averaged beacon-to-gateway measurements;

calculating second distances between the beacon and the gateways based on at least ones of the averaged beacon to gateway measurements and an expected measurement of power related to the beacon, wherein the first distances are used to select the at least ones of the averaged beacon to gateway measurements used for the calculating of the second distances;

determining and storing the physical position of the beacon based on the second distances;

an end terminal transceiver for transmitting the physical position of the beacon so that the physical position is subsequently displayed; and an end terminal for displaying the physical position of the beacon.

13. The apparatus for locating a physical position of a beacon in a physical space according to claim 12, wherein the beacon is associated with a sensor for measuring an environmental related parameter.

14. The apparatus for locating a physical position of a beacon in a physical space according to claim 13, wherein the position is displayed with the environmentally related parameter acquired by the sensor.

15. The apparatus for locating a physical position of a beacon in a physical space according to claim 12, wherein the first distances are Euclidean distances.

16. The apparatus for locating a physical position of a beacon in a physical space according to claim 12, wherein the second distances are based on a log distance propagation model.

17. The apparatus for locating a physical position of a beacon in a physical space according to claim 12, wherein the averaged gateway-to-gateway measurements are each a median.

18. The apparatus for locating a physical position of a beacon in a physical space according to claim 12, wherein the averaged beacon-to-gateway measurements are each a mean.

19. The apparatus for locating a physical position of a beacon in a physical space according to claim 12, wherein the gateway-to-gateway measurements of power that are stored are theoretical values of power at a distance from each of the gateways under perfect conditions.

20. The apparatus for locating a physical position of a beacon in a physical space according to claim 12, wherein the first distances are used to determine which of the at least ones of the averaged beacon-to-gateway measurements are used for calculating the second distances.

21. The apparatus for locating a physical position of a beacon in a physical space according to claim 12, wherein at least one of:

a) the gateway-to-gateway measurements; or b) the beacon-to-gateway measurements are normalized with each other prior to the averaging of the gateway-to-gateway measurements or prior to the averaging of the beacon-to-gateway measurements.

22. The apparatus for locating a physical position of a beacon in a physical space according to claim 12, wherein the physical position of the beacon is a first physical position that is transmitted, wherein if the beacon is moved to another physical position, the another physical position of the beacon is a second physical position that is transmitted, the second physical position being different from the first physical position.

* * * * *